(12) United States Patent
Puddle et al.

(10) Patent No.: US 10,009,812 B2
(45) Date of Patent: Jun. 26, 2018

(54) WIRELESS TELECOMMUNICATIONS NETWORK NODES AND METHODS

(71) Applicant: Alcatel Lucent, Boulogne Billancourt (FR)

(72) Inventors: Nicola Puddle, Swindon (GB); Shin Horng Wong, Swindon (GB); Graham R. Brend, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/023,486

(22) PCT Filed: Aug. 20, 2014

(86) PCT No.: PCT/EP2014/002288
§ 371 (c)(1),
(2) Date: Mar. 21, 2016

(87) PCT Pub. No.: WO2015/043708
PCT Pub. Date: Apr. 2, 2015

(65) Prior Publication Data
US 2016/0234739 A1    Aug. 11, 2016

(30) Foreign Application Priority Data

Sep. 26, 2013  (EP) .................................. 13306319

(51) Int. Cl.
*H04W 24/00* (2009.01)
*H04W 36/04* (2009.01)
(Continued)

(52) U.S. Cl.
CPC ........... *H04W 36/04* (2013.01); *H04W 24/02* (2013.01); *H04W 36/0055* (2013.01);
(Continued)

(58) Field of Classification Search
CPC ..... H04W 88/02; H04W 24/00; H04W 8/183; H04W 36/30; H04W 36/32; H04W 36/18;
(Continued)

(56) References Cited

U.S. PATENT DOCUMENTS

| 5,555,445 A | * | 9/1996 | Booth | H04W 36/30 455/436 |
| 6,097,953 A | * | 8/2000 | Bonta | H04W 36/30 455/436 |

(Continued)

FOREIGN PATENT DOCUMENTS

| CN | 102761380 A | 10/2012 |
| CN | 102792766 A | 11/2012 |

(Continued)

OTHER PUBLICATIONS

ZTE, "Considerations of E-DCH Decoupling in UMTS HetNets," 3rd Generation Partnership Project (3GPP), 3GPP TSG RAN WG1 Meeting #74, R1-133539, 5 pages, XP050716100, Barcelona, Spain, Aug. 19-23, 2013.

(Continued)

*Primary Examiner* — Steve D Agosta
(74) *Attorney, Agent, or Firm* — Fay Sharpe, LLP

(57) ABSTRACT

Wireless telecommunications network nodes, methods and computer program products are disclosed. A wireless telecommunications network node method, comprises determining a cause of a radio link failure which occurred when a user equipment is in proximity to an uplink-downlink imbalance region; and in response to the cause of the radio link failure, initiating action to optimize control of user equipment uplink-downlink decoupling-recoupling when in proximity to the uplink-downlink imbalance region. In this way, by establishing the cause of the radio link failure, it is possible to take action to alter the user equipment uplink- (Continued)

downlink decoupling-recoupling procedure in order to help prevent such radio link failures occurring in the future.

12 Claims, 1 Drawing Sheet

(51) Int. Cl.
| | |
|---|---|
| *H04W 36/00* | (2009.01) |
| *H04W 24/02* | (2009.01) |
| *H04W 36/24* | (2009.01) |
| *H04W 24/04* | (2009.01) |
| *H04W 76/02* | (2009.01) |
| *H04W 84/04* | (2009.01) |

(52) U.S. Cl.
CPC ............ *H04W 36/24* (2013.01); *H04W 24/04* (2013.01); *H04W 76/028* (2013.01); *H04W 84/045* (2013.01)

(58) Field of Classification Search
CPC .................. H04W 80/04; H04W 84/12; H04L 2012/5607
USPC ............. 455/421, 423–425, 432.1, 436–444; 370/310.2, 328, 331–334, 338
See application file for complete search history.

(56) References Cited

U.S. PATENT DOCUMENTS

| | | | |
|---|---|---|---|
| 6,188,905 B1* | 2/2001 | Rudrapatna | H04W 28/26 455/452.2 |
| 6,477,373 B1* | 11/2002 | Rappaport | H04W 36/12 455/436 |
| 8,060,100 B1* | 11/2011 | Rana | H04W 36/0061 370/208 |
| 8,219,101 B2* | 7/2012 | Shin | H04L 63/104 455/422.1 |
| 2003/0050084 A1* | 3/2003 | Damnjanovic | H04W 52/40 455/522 |
| 2008/0102841 A1* | 5/2008 | Kato | H04L 1/1874 455/442 |
| 2008/0205413 A1* | 8/2008 | Purnadi | H04W 36/0022 370/401 |
| 2009/0137240 A1* | 5/2009 | Dillon | H04W 36/30 455/423 |
| 2010/0184437 A1* | 7/2010 | Dimou | H04W 92/20 455/436 |
| 2010/0291931 A1* | 11/2010 | Suemitsu | H04W 36/245 455/436 |
| 2010/0325267 A1 | 12/2010 | Mishra | |
| 2012/0213092 A1* | 8/2012 | Sun | H04W 52/244 370/248 |
| 2013/0286865 A1* | 10/2013 | Johansson | H04W 36/18 370/252 |

FOREIGN PATENT DOCUMENTS

| | | |
|---|---|---|
| CN | 102823176 A | 12/2012 |
| JP | 20130118588 | 6/2013 |
| JP | 2013546230 | 12/2013 |
| JP | 2014525199 | 9/2014 |
| WO | 2012048174 | 4/2012 |
| WO | 2013012896 | 1/2013 |

OTHER PUBLICATIONS

Nokia Siemens Networks, "Introducing E-DCH decoupling in Hetnet deployments," 3$^{rd}$ Generation Partnership Project (3GPP), 3GPP TSG RAN WG1 Meeting #73, R1-132529, 7 pages, XP050698247, Fukuoka, Japan, May 20-24, 2013.
International Search Report for PCT/EP2014/002288 dated Oct. 20, 2014.
Huawei, Hisilicon, 3GPP TSG RAN Meeting #61, Porto, Portugal, Sep. 3-6, 2013, New WI proposal: UMTS Heterogeneous Networks enhancements—Performance, RP-131189.
Huawei, Hisilicon, 3GPP TSG RAN Meeting #61, Porto, Portugal, Sep. 3-6, 2013, New WI proposal: UMTS Heterogeneous Networks enhancements—Core, RP-131189.
Huawei, Hisilicon, 3GPP TSG RAN Meeting #61, Porto, Portugal, Sep. 3-6, 2013, New WI proposal: UMTS Heterogeneous Networks enhancements—Feature, RP-131189.
RAN WG1, 3GPP TSG-RAN #61, Porto, Portugal, Sep. 3-6, 2013, TR 25.800 Study on UMTS heterogeneous networks, Version 2.0.0, RP-131186.
New Postcom, Further considerations on RLF root cause value, 3GPP TSG-RAN WG3 Meeting #77 R3-121553, [online], Aug. 4, 2012, pp. 1-3, [searched Apr. 18, 2017], URL, http://www.3gpp.org/ftp/tsg_ran/WG3_lu/TSGR3_77/Docs/R3-121553.zip.
Ericsson, Analysis and support of enhanced mobility in HetNet deployments, 3GPP TSG-RAN WG3 Meeting #74 R3-112989, [online], Nov. 4, 2011, pp. 1-6, [searched Apr. 18, 2017], URL, http://www.3gpp.org/ftp/tsg_ran/WG3_lu/TSGR3_74/Docs/R3-112989.zip.
Nokia Siemens Networks, The way forward concerning HetNet MRO solutions, 3GPP TSG-RAN WG3 Meeting #75-bis R3-120894, [online], Apr. 2, 2012, URL, http://www.3gpp.org/ftp/tsg_ran/WG3_lu/TSGR3_75bis/Docs/R3-120894.zip.
Alcatel-Lucent, Alcatel-Lucent Shanghai Bell, Considerations on Common E-RGCH, 3GPP TSG-RAN WG1 Meeting #74 R1-132948, [online], Aug. 10, 2013, pp. 1-2, [searched Apr. 18, 2017], URL, http://www.3gpp.org/ftp/tsg_ran/WG1_RL1/TSGR1_74/Docs/R1-132948.zip.

* cited by examiner

WIRELESS TELECOMMUNICATIONS NETWORK NODES AND METHODS

FIELD OF THE INVENTION

The present invention relates to wireless telecommunications network nodes, methods and computer program products.

BACKGROUND

Wireless telecommunication networks are known. In such networks, mobile communication devices (for example, mobile telephones) are operable to communicate with base stations provided by network providers.

In known wireless telecommunication networks, radio coverage is provided to network connectable devices, such as mobile telephones, or wireless devices such as tablets, within areas known as cells. A base station is located in each cell to provide radio coverage. Typically, network connectable devices in each cell are operable to receive information and data from a base station and to transmit information and data to a base station.

User equipment roam through the wireless communications network. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links.

Traditional base stations provide coverage in relatively large geographical areas and those cells are often referred to as macro cells. It is possible to provide a heterogeneous network (HetNet) where smaller-sized cells are provided within macro cells. Such smaller sized cells are sometimes referred to as low-power nodes (LPN), micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator.

Although HetNet deployments may offer advantages, unexpected consequences of such deployments may occur. It is desired to address those consequences.

SUMMARY

According to a first aspect, there is provided a wireless telecommunications network node method, comprising: determining a cause of a radio link failure which occurred when a user equipment is in proximity to an uplink-downlink imbalance region; and in response to the cause of the radio link failure, initiating action to optimize control of user equipment uplink-downlink decoupling-recoupling when in proximity to the uplink-downlink imbalance region.

Small cells have extensive auto-configuration and self-optimization capabilities to enable a simple plug and play deployment, and are designed to automatically integrate themselves into an existing macro cellular network. A network that has both small cells and macro cells deployed is referred to as a Heterogeneous network (HetNet).

In a HetNet deployment, small cells are deployed under macro cell coverage to improve coverage and/or capacity of the system. FIG. 1 shows a HetNet deployment with a macro cell and a small cell. In this figure the UL (uplink) boundary is where the UE uplink path loss to the macro cell and to the small cell are the same. The DL (downlink) boundary is where the received pilot power from the macro cell and the received pilot power from the small cell are the same at the UE. This is different from a homogeneous network (i.e. macro cell only deployment), where the UL and DL boundaries are at the same points in the network. However, in HetNet deployment, the small cell has a lower transmit power than the macro cell. As a consequence of this, the UL and DL boundaries are different as shown in FIG. 1. The region between the UL and DL boundaries is referred to as the UL-DL imbalance region.

A UE in the UL-DL imbalance region that is connected to the macro cell (as shown in FIG. 1) will create strong interference to the small cell. This scenario is applicable to both LTE and UMTS radio access technologies. In UMTS, the strong uplink interference will occur if this UE is not in the SHO (soft handover) region as shown in FIG. 1.

Given the difference in UL and DL boundaries, it is proposed that the uplink and downlink are decoupled, whereby the uplink and downlink streams are served by different cells. In the example in FIG. 1, the downlink is served by the serving macro cell whilst the uplink is served by the small cell. Hence, instead of generating strong interference to the small cell, the small cell demodulates the UL signal for this UE.

However, the first aspect recognises that there is no known solution for describing the detection of the problems that could happen when an UL-DL imbalance region is established.

Accordingly, a method for a wireless telecommunications network node is provided. The method may comprise the step of determining or establishing a likely cause or reason for a radio failure link which occurred when user equipment is in proximity to an uplink-downlink imbalance region. It will be appreciated that a user equipment is in proximity to such a region when it is adjacent, close to or within that region. The method may also comprise the step of, when the cause of the radio link failure has been determined, initiating or commencing action which optimizes or adjusts the control of user equipment uplink-downlink decoupling-recoupling when in proximity to the uplink-downlink imbalance region. In this way, by establishing the cause of the radio link failure, it is possible to take action to alter the user equipment uplink-downlink decoupling-recoupling procedure in order to help prevent such radio link failures occurring in the future.

In one embodiment, wherein the step of determining comprises determining that the radio link failure occurred in uplink due to one of uplink-downlink decoupling and uplink-downlink recoupling occurring one of too early and too late; and the step of initiating action comprises optimising control of user equipment to perform a corresponding one of uplink-downlink decoupling and uplink-downlink recoupling a corresponding one of later and earlier than previously. Accordingly, it may be determined that decoupling or recoupling occurred either too early or too late and that this caused the radio link failure. The method may also comprise taking some action to optimize or adapt either the decoupling or recoupling procedure to be performed either later or earlier than currently occurs. In other words, if the decoupling or recoupling has been determined to occur too early then the decoupling or recoupling is optimized to occur later. Likewise, if the decoupling or recoupling occurs too late, this is optimized to occur earlier.

In one embodiment, the step of determining comprises determining that the radio link failure occurred in uplink due to uplink-downlink decoupling occurring too late when higher than a threshold amount of interference is received on the uplink by the network node, followed by a handover of user equipment to the network node coinciding with a reduction in the interference and the step of initiating action comprises optimising control of user equipment to perform uplink-downlink decoupling earlier than previously.

In one embodiment, the step of determining comprises determining that the radio link failure occurred in uplink due to uplink-downlink recoupling occurring too early when higher than a threshold amount of interference is received on the uplink by the network node following a uplink-downlink recoupling of user equipment, followed by a handover of user equipment to the network node coinciding with a reduction in the interference and the step of initiating action comprises optimising control of user equipment to perform uplink-downlink recoupling later than previously.

In one embodiment, the step of determining comprises determining that the radio link failure occurred in uplink due to uplink-downlink recoupling occurring too late when the radio link failure in uplink occurred following a uplink-downlink recoupling of user equipment following an uplink-downlink decoupling of the user equipment for greater than a threshold amount of time and the step of initiating action comprises optimising control of user equipment to perform uplink-downlink recoupling earlier than previously.

In one embodiment, the step of determining comprises determining that the radio link failure occurred in uplink due to uplink-downlink decoupling occurring too early when the radio link failure in uplink occurred within a threshold amount of time following a uplink-downlink decoupling of user equipment and the step of initiating action comprises optimising control of user equipment to perform uplink-downlink decoupling later than previously.

In one embodiment, the step of determining comprises determining that the radio link failure occurred in downlink in response to a radio link failure message received from the user equipment. Accordingly, the occurrence of the radio link failure may be indicated by messaging received from the user equipment.

In one embodiment, the radio link failure message indicates that one of the uplink-downlink decoupling and uplink-downlink recoupling occurred one of too early and too late and the step of initiating action comprises optimising control of user equipment to perform a corresponding one of uplink-downlink decoupling and uplink-downlink recoupling a corresponding one of later and earlier than previously in response to the radio link failure message. Accordingly, the message may indicate the cause of the radio link failure and a corresponding action may be taken to configure the decoupling or recoupling to occur at a different time.

In one embodiment, the radio link failure message comprises at least one of an indication of a downlink serving cell and an uplink serving cell when the radio link failure occurred.

In one embodiment, the step of initiating action comprises providing an indication of at least one of the cause of the radio link failure and the action to that network node responsible for control of user equipment uplink-downlink decoupling-recoupling when in proximity to the uplink-downlink imbalance region. Accordingly, the network node which is responsible for controlling the decoupling or recoupling procedure is notified that the failure occurred in order that that network node may take the appropriate action.

In one embodiment, the step of determining comprises determining that the radio link failure occurred in uplink in response to at least one of the indication of the cause of the radio link failure and the action received from another network node.

In one embodiment, the step of initiating action comprises initiating action to optimize control of user equipment uplink-downlink decoupling-recoupling when in proximity to the uplink-downlink imbalance region when greater than a threshold amount of radio link failures are determined. Accordingly, rather than responding to every radio link failure, instead a threshold may be defined which, when exceeded, will result in optimizations being made. This helps to improve the stability of the network.

In one embodiment, the step of initiating action comprises adjusting at least one of: an uplink boundary and a downlink boundary defining the uplink-downlink imbalance region; and parameters triggering the user equipment uplink-downlink decoupling-recoupling. Accordingly, the transmission powers may be adjusted in order to change the location of the uplink and/or the downlink boundaries. Likewise, the parameters such as the thresholds at which user equipment makes its various measurement reports which trigger the decoupling or recoupling may be adjusted in order to change when the decoupling or recoupling procedure is initiated.

According to a second aspect, there is provided a wireless telecommunications network node, comprising: determining logic operable to determine a cause of a radio link failure which occurred when a user equipment is in proximity to an uplink-downlink imbalance region and, in response to the cause of the radio link failure, to initiate action to optimize control of user equipment uplink-downlink decoupling-recoupling when in proximity to the uplink-downlink imbalance region.

In one embodiment, the determining logic is operable to determine that the radio link failure occurred in uplink due to one of uplink-downlink decoupling and uplink-downlink recoupling occurring one of too early and too late and to optimize control of user equipment to perform a corresponding one of uplink-downlink decoupling and uplink-downlink recoupling a corresponding one of later and earlier than previously.

In one embodiment, the determining logic is operable to determine that the radio link failure occurred in uplink due to uplink-downlink decoupling occurring too late when higher than a threshold amount of interference is received on the uplink by the network node, followed by a handover of user equipment to the network node coinciding with a reduction in the interference and to optimize control of user equipment to perform uplink-downlink decoupling earlier than previously.

In one embodiment, the determining logic is operable to determine that the radio link failure occurred in uplink due to uplink-downlink recoupling occurring too early when higher than a threshold amount of interference is received on the uplink by the network node following a uplink-downlink recoupling of user equipment, followed by a handover of user equipment to the network node coinciding with a reduction in the interference and to optimize control of user equipment to perform uplink-downlink recoupling later than previously.

In one embodiment, the determining logic is operable to determine that the radio link failure occurred in uplink due to uplink-downlink recoupling occurring too late when the radio link failure in uplink occurred following a uplink-downlink recoupling of user equipment following an uplink-downlink decoupling of the user equipment for greater than a threshold amount of time and to optimize control of user equipment to perform uplink-downlink recoupling earlier than previously.

In one embodiment, the determining logic is operable to determine that the radio link failure occurred in uplink due to uplink-downlink decoupling occurring too early when the radio link failure in uplink occurred within a threshold amount of time following a uplink-downlink decoupling of user equipment and to optimize control of user equipment to perform uplink-downlink decoupling later than previously.

In one embodiment, the determining logic is operable to determine that the radio link failure occurred in downlink in response to a radio link failure message received from the user equipment.

In one embodiment, the radio link failure message indicates that one of the uplink-downlink decoupling and uplink-downlink recoupling occurred one of too early and too late and the determining logic is operable to optimize control of user equipment to perform a corresponding one of uplink-downlink decoupling and uplink-downlink recoupling a corresponding one of later and earlier than previously in response to the radio link failure message.

In one embodiment, the radio link failure message comprises at least one of an indication of a downlink serving cell and an uplink serving cell when the radio link failure occurred.

In one embodiment, the determining logic is operable to initiate action to optimize control by providing an indication of at least one of the cause of the radio link failure and the action to that network node responsible for control of user equipment uplink-downlink decoupling-recoupling when in proximity to the uplink-downlink imbalance region.

In one embodiment, the determining logic is operable to determine that the radio link failure occurred in uplink in response to at least one of the indication of the cause of the radio link failure and the action received from another network node.

In one embodiment, the determining logic is operable to optimize control of user equipment uplink-downlink decoupling-recoupling when in proximity to the uplink-downlink imbalance region when greater than a threshold amount of radio link failures are determined.

In one embodiment, the determining logic is operable to initiate action by adjusting at least one of: an uplink boundary and a downlink boundary defining the uplink-downlink imbalance region; and parameters triggering the user equipment uplink-downlink decoupling-recoupling.

According to a third aspect, there is provided a wireless telecommunications user equipment method, comprising: determining a cause of a radio link failure which occurred when the user equipment is in proximity to an uplink-downlink imbalance region; and in response to the cause of the radio link failure, initiating action to optimize control of user equipment uplink-downlink decoupling-recoupling when in proximity to the uplink-downlink imbalance region.

In one embodiment, the step of determining comprises determining that the radio link failure occurred in downlink due to one of uplink-downlink decoupling and uplink-downlink recoupling occurring one of too early and too late; and the step of initiating action comprises transmitting a radio link failure message indicating that one of the uplink-downlink decoupling and uplink-downlink recoupling occurred one of too early and too late.

In one embodiment, the step of determining comprises determining that the radio link failure occurred in downlink due to uplink-downlink recoupling occurring too late when the radio link failure in downlink occurred after a threshold amount of time following uplink-downlink decoupling of user equipment and the step of initiating action comprises optimising control of user equipment to perform uplink-downlink recoupling earlier than previously.

In one embodiment, the step of determining comprises determining that the radio link failure occurred in downlink due to uplink-downlink recoupling occurring too early when the radio link failure in downlink occurred within a threshold amount of time following uplink-downlink recoupling to that cell previously receiving uplink and the step of initiating action comprises optimising control of user equipment to perform uplink-downlink recoupling later than previously.

In one embodiment, the step of determining comprises determining that the radio link failure occurred in downlink due to uplink-downlink decoupling occurring too late when the radio link failure in downlink occurred within a threshold amount of time following being configured for uplink-downlink decoupling, but prior to the uplink-downlink decoupling occurring and the step of initiating action comprises optimising control of user equipment to perform uplink-downlink decoupling earlier than previously.

In one embodiment, the step of determining comprises determining that the radio link failure occurred in downlink due to uplink-downlink decoupling occurring too early when the radio link failure in downlink occurred within a threshold amount of time following initiation of uplink-downlink decoupling, and the step of initiating action comprises optimising control of user equipment to perform uplink-downlink decoupling later than previously.

In one embodiment, the radio link failure message comprises at least one of an indication of a downlink serving cell and an uplink serving cell when the radio link failure occurred.

According a fourth aspect, there is provided wireless telecommunications user equipment, comprising: determining logic operable to determine a cause of a radio link failure which occurred when the user equipment is in proximity to an uplink-downlink imbalance region and, in response to the cause of the radio link failure, to initiate action to optimize control of user equipment uplink-downlink decoupling-recoupling when in proximity to the uplink-downlink imbalance region.

In one embodiment, the determining logic is operable to determine that the radio link failure occurred in downlink due to one of uplink-downlink decoupling and uplink-downlink recoupling occurring one of too early and too late and to initiate action by transmitting a radio link failure message indicating that one of the uplink-downlink decoupling and uplink-downlink recoupling occurred one of too early and too late.

In one embodiment, the determining logic is operable to determine that the radio link failure occurred in downlink due to uplink-downlink recoupling occurring too late when the radio link failure in downlink occurred after a threshold amount of time following uplink-downlink decoupling of user equipment and to initiate action by optimising control of user equipment to perform uplink-downlink recoupling earlier than previously.

In one embodiment, the determining logic is operable to determine that the radio link failure occurred in downlink due to uplink-downlink recoupling occurring too early when the radio link failure in downlink occurred within a threshold amount of time following uplink-downlink recoupling to that cell previously receiving uplink and to initiate action by optimising control of user equipment to perform uplink-downlink recoupling later than previously.

In one embodiment, the determining logic is operable to determine that the radio link failure occurred in downlink due to uplink-downlink decoupling occurring too late when the radio link failure in downlink occurred within a threshold amount of time following being configured for uplink-downlink decoupling, but prior to the uplink-downlink decoupling occurring and to initiate action comprises by optimising control of user equipment to perform uplink-downlink decoupling earlier than previously.

In one embodiment, the determining logic is operable to determine that the radio link failure occurred in downlink due to uplink-downlink decoupling occurring too early when the radio link failure in downlink occurred within a threshold amount of time following initiation of uplink-downlink decoupling and to initiate action by optimising control of user equipment to perform uplink-downlink decoupling later than previously.

In one embodiment, the radio link failure message comprises at least one of an indication of a downlink serving cell and an uplink serving cell when the radio link failure occurred.

According to a fifth aspect, there is provided a computer program product operable, when executed on a computer, to perform the method steps of the first or the third aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
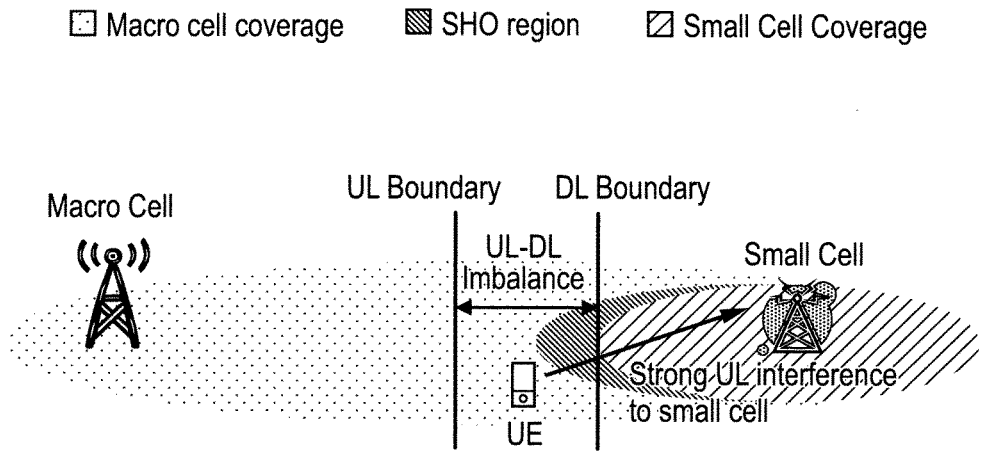
FIG. 1 illustrates an uplink-downlink imbalance region.

Before discussing embodiments in any more detail, first an overview will be provided. Embodiments provide a technique whereby the cause or the reason for a radio link failure is identified and that additional information is utilised in order to improve the operation of uplink-downlink decoupling or recoupling. In particular, logic is provided within the user equipment and the network which identifies, when a radio link failure occurs, whether the user equipment is in proximity to an uplink-downlink imbalance region and, if so, determines a likely cause for the radio link failure. This cause can then be signalled to the network node (such as a base station) responsible for controlling the operation of the decoupling or recoupling procedure so that the procedure can be optimized to prevent such radio link failures occurring in future. Typically, the failures occur due to the decoupling or recoupling procedure occurring either too early or too late. The optimization changes either the transmission power such that the location of the uplink or downlink boundaries moves, or changes the parameters within the user equipment that trigger the various measurement reports being sent which initiate the decoupling or recoupling procedure. These optimizations help to ensure that the decoupling or recoupling procedure occurs at the right time in order to reduce the incidence of such radio link failures in future.

Embodiments introduce logic in the user equipment and the network for the detection of (uplink-downlink) UL-DL decoupling problems and then use the results of this detection to adjust the boundaries of the UL-DL imbalance region appropriately and/or to adjust the parameters of the user equipment when reporting and/or performing UL-DL decoupling and/or recoupling.

One of the likely impacts of the network not having an optimally configured UL-DL imbalance region is an increased prevalence of user equipment experiencing downlink radio link failures (RLF) particularly when these user equipment are mobile near to, or in, the UL-DL imbalance region. Likewise, there may be an increased prevalence of the network experiencing uplink RLF from user equipment that are again near to, or in, the UL-DL imbalance region.

Hence, embodiments provide logic which detects RLF that are likely to have been caused by incorrectly configured UL & DL boundaries and/or UL-DL decoupling/recoupling parameters, and to subsequently use this information to optimize the boundaries of the imbalance region and/or adjust UL-DL decoupling/recoupling parameters.

For UL-DL decoupling activation (decoupling) & decoupling deactivation (recoupling) there are scenarios that are relevant for the UL & DL. In the scenarios defined below, it will be appreciated that the references to RLF are generic and refer to:
 a) The specific user equipment RLF reporting feature for Long Term Evolution (LTE) network deployments; or
 b) The reception by the Radio Network Controller (RNC) of an Radio Resource Connection (RRC) Cell Update message from a user equipment with a cause set to "RadioLinkFailure" for Universal Mobile Telecommunications System (UMTS) deployments.

Downlink Failures

For the DL, a range of possible reportable RLF are defined, for each of which a corresponding optimisation for UL-DL configuration is possible.

1) UL-DL Recoupling (Decoupling Deactivation) Occurs Too Late

In this scenario, the user equipment's downlink is handled by cell A and the uplink by cell B. This late deactivation is detected by logic on the user equipment when a DL RLF occurs after the user equipment has an existing active configuration for UL-DL decoupling and has stayed for a long period of time with the downlink handled by cell A and uplink by cell B; in this scenario the UE will attempt to re-establish the whole radio link connection to either cell B or cell A. The optimisation is to adjust the boundaries of the UL-DL imbalance region and/or to adjust the parameters of the user equipment when reporting and/or performing UL-DL recoupling so that UL-DL recoupling occurs earlier than currently configured.

2) UL-DL Recoupling (Decoupling Deactivation) is Triggered Too Early

In this scenario, the user equipment's downlink is handled by cell A and the uplink by cell B. This early deactivation is detected by logic on the user equipment when a DL RLF occurs in the user equipment shortly after the base station (eNB) has deactivated the UL-DL decoupling such that both DL and UL are handled by cell B (i.e. when the UL & DL are recoupled and handled by cell B). The optimisation is to adjust the boundaries of the UL-DL imbalance region and/or to adjust the parameters of the user equipment when reporting and/or performing UL-DL recoupling so that UL-DL recoupling occurs later than currently configured.

3) UL-DL Decoupling Activation Occurs Too Late

A DL RLF is detected in the user equipment shortly after the base station (eNB) has configured the user equipment for UL-DL decoupling, but the decoupling has not yet been activated. The optimisation is to adjust the boundaries of the UL-DL imbalance region and/or to adjust the parameters of the user equipment when reporting and/or performing UL-DL decoupling so that UL-DL decoupling occurs earlier than currently configured.

4) UL-DL Decoupling Activation is Triggered Too Early

A DL RLF is detected by the user equipment shortly after the UL-DL has been decoupled, or a failure actually occurs during the activation of the decoupling procedure; the user equipment will attempt to re-establish the radio link connection to the original coupled cell. The optimisation is to adjust the boundaries of the UL-DL imbalance region and/or to adjust the parameters of the user equipment when reporting and/or performing UL-DL decoupling so that UL-DL decoupling occurs later than currently configured.

It will be appreciated that failure during the UL-DL decoupling activation procedure would be detected when the user equipment receives no ACK or NACK on DL.

For the four scenarios above, the user equipment will typically provide a new RLF Report to the base station (eNB) after successful RRC re-establishment (for LTE deployments) or the UE may provide a new RLF report to the base station (Node B) during a successful Cell Update procedure (for UMTS deployments). The RLF Report will typically indicate the possible cause of the failure and/or a possible optimisation. The radio measurements contained in the RLF Report may be used by logic introduced in the network to identify the UL-DL imbalance region as the potential cause of the failure.

Thus embodiments provide logic in the user equipment that will provide additional information to the network when it detects a RLF, new information elements are introduced in the user equipment's RLF-report message or Cell Update message to show that the RLF was due to UL-DL decoupling and to enable the user equipment to provide the UL cell Identifier.

In addition, embodiments introduce logic in the network, such that the cell that receives the RLF-report from the user equipment will forward the information received from the user equipment in an RLF INDICATION type message to the cell which sent the previous HS-SCCH order to activate or deactivate the UL-DL decoupling. Alternatively, if the cell that receives the RLF report was the one that activated or deactivated the UL-DL decoupling, it will use the information provided by the user equipment itself.

Uplink Failures

For the UL, a range of possible reportable RLF are defined, for each of which a corresponding optimisation for UL-DL configuration is possible.

1) UL-DL Decoupling Activation Occurs Too Late

This is detected in the small cell, which experiences strong UL interference from a user equipment, followed by a handover of a user equipment from an adjacent macro cell and the removal of the strong UL interference. The small cell can assume that the user equipment that was generating the strong interference has now been handed over to the small cell. The optimisation is to adjust the boundaries of the UL-DL imbalance region and/or to adjust the parameters of the user equipment when reporting and/or performing UL-DL decoupling so that UL-DL decoupling occurs earlier than currently configured.

In UMTS where soft handover (SHO) is available, the small cell would be able to demodulate the user equipment uplink signal. An UL-DL decoupling activation is deemed too late if the user equipment pilot power is powered down (by the Inner Loop Power Control (ILPC)) by an amount larger than a threshold, e.g. by using the difference in user equipment pilot power just when it added the small cell to the active set and the user equipment pilot power when UL-DL decoupling activation occurs.

Another method in UMTS where SHO is available is when the serving macro cell's uplink signal falls below a threshold when the UL-DL activation occurs.

2) UL-DL Recoupling (Decoupling Deactivation) is Triggered Too Early

This is detected in the small cell, which experiences strong UL interference from a user equipment immediately after UL-DL decoupling deactivation (both links are recoupled back to macro), followed by a handover of a user equipment from an adjacent macro cell and the removal of the strong UL interference. The small cell can assume that the user equipment generating the strong interference has now been handed over to the small cell. The optimisation is to adjust the boundaries of the UL-DL imbalance region and/or to adjust the parameters of the user equipment when reporting and/or performing UL-DL decoupling so that UL-DL recoupling occurs later than currently configured.

In the above two cases embodiments utilize logic on the small cell base station to determine when these problems occur and additionally to send a type of RLF INDICATION message to the macro cell including information to advise that the small cell has determined that UL-DL decoupling has been activated too late, or recoupling too early, prior to a handover.

3) UL-DL Recoupling (Decoupling Deactivation) Occurs Too Late

A RLF on the UL is detected in either the macro or small cell shortly after a user equipment's existing decoupling is deactivated (i.e. the UL-DL is recoupled). Alternatively, an existing active configuration for UL-DL decoupling exists for a long period of time and then RLF is detected by either the macro or small cell. The optimisation is to adjust the boundaries of the UL-DL imbalance region and/or to adjust the parameters of the user equipment when reporting and/or performing UL-DL recoupling so that UL-DL recoupling occurs earlier than currently configured.

4) UL-DL Decoupling Activation is Triggered Too Early

A RLF on the UL is detected in either the macro or small cell shortly after decoupling activation. The optimisation is to adjust the boundaries of the UL-DL imbalance region and/or to adjust the parameters of the user equipment when reporting and/or performing UL-DL decoupling so that UL-DL decoupling occurs later than currently configured.

In the above two cases embodiments utilise logic in the cell that detects the problem such that it can report a type of RLF INDICATION message to the cell causing the problem, in this case to advise that the cell detected that the UL-DL decoupling was deactivated too early/late, or decoupling was activated too early/late.

UL and DL problems due to decoupling activation or deactivation can be detected simultaneously at the eNB and user equipment, hence, under certain scenarios, the combination of the user equipment and network detection provides an enhanced indication that there is a problem with the UL-DL decoupling.

In an embodiment, the RLF INDICATION type message can be sent from the detecting cell to the receiving cell:
  c) each time a failure is detected;
  d) after a defined threshold number of failures has occurred within a certain period of time, in which case the detecting cell will send the group of failure detection information to the receiving cell;
  e) only after a defined threshold number of failures within a certain period has been exceeded.

Once information relating to UL-DL decoupling issues has been received by the cell responsible for triggering the HS-SCCH order to perform the UL-DL decoupling/recoupling it can adjust the UL & DL boundaries of the UL-DL imbalance region appropriately and/or to adjust the parameters of the user equipment when reporting and/or performing UL-DL decoupling/recoupling.

Example Operation

Figure 2:
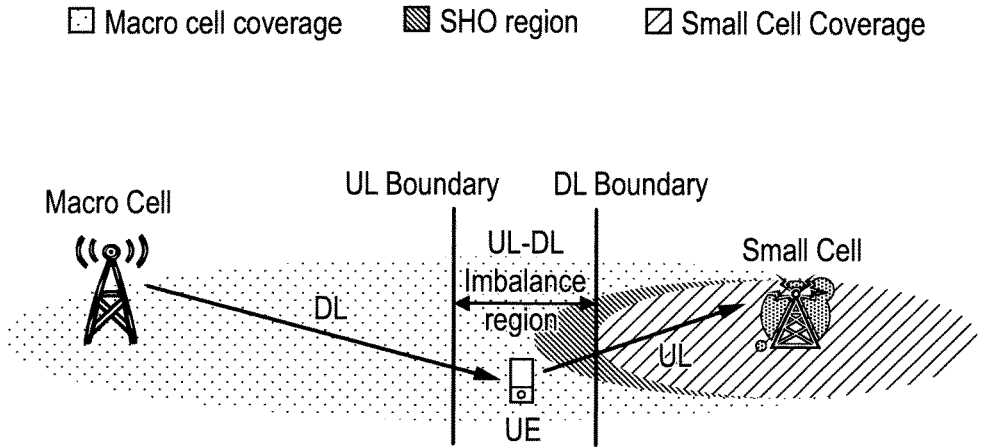
FIG. 2 illustrates uplink-downlink decoupling.

FIG. 2 shows a user equipment with its UL and DL decoupled. In this arrangement, the macro cell is used for DL and the small cell for UL. In this example, UL-DL recoupling (decoupling deactivation) occurs too late.

The user equipment has been activated for UL-DL decoupling by the macro cell, and this situation has remained for a while, where the DL is from the macro cell and the UL to the small cell.

For LTE, at some point the user equipment detects a DL RLF and re-establishes the radio link connection to the small cell, the user equipment indicates the following in the RLF-report:
  the last DL serving cell was the macro cell;
  a new connectionFailureType in the UE RLF-report value (e.g. UDDF (UL-DL Decoupling failure)); and
  the UL serving cell information (e.g. Cell Id of the small cell) is also required as a new information element.

In this example, the small cell also detects a RLF of the UL. The small cell reports this event to the macro cell by means of the RLF Indication Procedure including the user equipment RLF-report. For LTE the RLF Indication message can be sent either directly from the small cell to the macro cell (across an X2 interface) or via the core network (CN) i.e. across the Si interfaces between the small cell and the Mobility Management Entity (MME) and between the MME and the macro cell.

The macro cell can then use information from the RLF INDICATION message to determine whether the failure occurred in the serving (macro) cell.

The macro cell is expected to have saved the last few messages and interactions with the user equipment before the user equipment disappeared, thereby being aware that the last DL message was an activation of the UL-DL decoupling and being able to determine whether the problem could have been averted if the macro cell had deactivated the UL-DL decoupling earlier.

Using the same scenario for UMTS, the user equipment detects a DL RLF and re-establishes the radio link connection to the small cell, using the CELL UPDATE procedure. The reporting between small cell and macro cell can be achieved using the RADIO LINK FAILURE INDICATION message. In this case, the RADIO LINK FAILURE INDICATION message can be sent from the small cell to the macro cell across the Iub/Iuh & Iu interfaces.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method, performed by a wireless telecommunications network node, comprising:
   determining a cause of a radio link failure in at least one of uplink and downlink which occurred when a user equipment is in proximity to an uplink-downlink imbalance region, which is a region between a downlink boundary of a small cell and a macro cell, said downlink boundary being where received pilot power from said macro cell and received pilot power from said small cell are the same and an uplink boundary of said small cell and said macro cell, said uplink boundary being where uplink path loss to said macro cell and to said small cell are the same, comprising determining that said radio link failure occurred due to one of uplink-downlink decoupling in which uplink and downlink streams are served by different cells, and uplink-downlink recoupling in which uplink and downlink streams are served by a same cell, occurring one of too early and too late; and
   in response to said cause of said radio link failure, initiating action to optimize control of user equipment uplink-downlink decoupling-recoupling when in proximity to said uplink-downlink imbalance region by adjusting control of user equipment to perform a corresponding one of uplink-downlink decoupling and uplink-downlink recoupling a corresponding one of later and earlier than previously;
   wherein said determining comprises determining that said radio link failure occurred in uplink due to at least one of:
   uplink-downlink decoupling occurring too late when higher than a threshold amount of interference is received on said uplink by said network node, followed by a handover of user equipment to said network node coinciding with a reduction in said interference and said initiating action comprises optimising control of user equipment to perform uplink-downlink decoupling earlier than previously;
   uplink-downlink recoupling occurring too early when higher than a threshold amount of interference is received on said uplink by said network node following an uplink-downlink recoupling of user equipment, followed by a handover of user equipment to said network node coinciding with a reduction in said interference and said initiating action comprises optimising control of user equipment to perform uplink-downlink recoupling later than previously;
   uplink-downlink recoupling occurring too late when said radio link failure in uplink occurred following an uplink-downlink recoupling of user equipment following an uplink-downlink decoupling of said user equipment for greater than a threshold amount of time and said initiating action comprises optimising control of user equipment to perform uplink-downlink recoupling earlier than previously; and
   uplink-downlink decoupling occurring too early when said radio link failure in uplink occurred within a threshold amount of time following an uplink-downlink decoupling of user equipment and said initiating action comprises optimising control of user equipment to perform uplink-downlink decoupling later than previously.

2. The method of claim 1, wherein said determining comprises determining that said radio link failure occurred in said uplink.

3. The method of claim 1, wherein said determining comprises determining that said radio link failure occurred in said downlink in response to a radio link failure message received from said user equipment.

4. The method of claim 1, wherein said initiating action comprises providing an indication of at least one of said cause of said radio link failure and said action to that network node responsible for control of user equipment uplink-downlink decoupling-recoupling when in proximity to said uplink-downlink imbalance region.

5. The method of claim 1, wherein said determining comprises determining that said radio link failure occurred in uplink in response to at least one of said indication of said cause of said radio link failure and said action received from another network node.

6. The method of claim 1, wherein said initiating action comprises initiating action to optimize control of user equipment uplink-downlink decoupling-recoupling when in proximity to said uplink-downlink imbalance region when greater than a threshold amount of radio link failures are determined.

7. The method of claim 1, wherein said initiating action comprises adjusting at least one of: an uplink boundary and a downlink boundary defining said uplink-downlink imbalance region; and parameters triggering said user equipment uplink-downlink decoupling-recoupling.

8. A method, performed by a wireless telecommunications network node, comprising:
   determining a cause of a radio link failure in at least one of uplink and downlink which occurred when a user equipment is in proximity to an uplink-downlink imbalance region, which is a region between a downlink boundary of a small cell and a macro cell, said downlink boundary being where received pilot power from said macro cell and received pilot power from said small cell are the same and an uplink boundary of said small cell and said macro cell, said uplink boundary being where uplink path loss to said macro cell and to said small cell are the same, comprising determining that said radio link failure occurred due to one of uplink-downlink decoupling in which uplink and downlink streams are served by different cells, and uplink-downlink recoupling in which uplink and downlink streams are served by a same cell, occurring one of too early and too late; and
   in response to said cause of said radio link failure, initiating action to optimize control of user equipment uplink-downlink decoupling-recoupling when in proximity to said uplink-downlink imbalance region by adjusting control of user equipment to perform a corresponding one of uplink-downlink decoupling and uplink-downlink recoupling a corresponding one of later and earlier than previously;
   wherein said determining comprises determining that said radio link failure occurred in said downlink in response to a radio link failure message received from said user equipment;
   wherein said radio link failure message indicates that one of said uplink-downlink decoupling and uplink-downlink recoupling occurred one of too early and too late and said initiating action comprises optimising control of user equipment to perform a corresponding one of uplink-downlink decoupling and uplink-downlink recoupling a corresponding one of later and earlier than previously in response to said radio link failure message.

9. A method, performed by a wireless telecommunications network node, comprising:
determining a cause of a radio link failure in at least one of uplink and downlink which occurred when a user equipment is in proximity to an uplink-downlink imbalance region, which is a region between a downlink boundary of a small cell and a macro cell, said downlink boundary being where received pilot power from said macro cell and received pilot power from said small cell are the same and an uplink boundary of said small cell and said macro cell, said uplink boundary being where uplink path loss to said macro cell and to said small cell are the same, comprising determining that said radio link failure occurred due to one of uplink-downlink decoupling in which uplink and downlink streams are served by different cells, and uplink-downlink recoupling in which uplink and downlink streams are served by a same cell, occurring one of too early and too late; and
in response to said cause of said radio link failure, initiating action to optimize control of user equipment uplink-downlink decoupling-recoupling when in proximity to said uplink-downlink imbalance region by adjusting control of user equipment to perform a corresponding one of uplink-downlink decoupling and uplink-downlink recoupling a corresponding one of later and earlier than previously;
wherein said determining comprises determining that said radio link failure occurred in said downlink in response to a radio link failure message received from said user equipment;
wherein said radio link failure message comprises at least one of an indication of a downlink serving cell and an uplink serving cell when said radio link failure occurred.

10. A wireless telecommunications network node, comprising:
determining logic operable to determine a cause of a radio link failure in at least one of uplink and downlink which occurred when a user equipment is in proximity to an uplink-downlink imbalance region which is a region between a downlink boundary of a small cell and a macro cell, said downlink boundary being where received pilot power from said macro cell and received pilot power from said small cell are the same and an uplink boundary of said small cell and said macro cell, said uplink boundary being where uplink path loss to said macro cell and to said small cell are the same, and operable to determine that said radio link failure occurred due to one of uplink-downlink decoupling in which uplink and downlink streams are served by different cells, and uplink-downlink recoupling in which uplink and downlink streams are served by a same cell, occurring one of too early and too late and,
in response to said cause of said radio link failure, to initiate action to optimize control of user equipment uplink-downlink decoupling-recoupling when in proximity to said uplink-downlink imbalance region by adjusting control of user equipment to perform a corresponding one of uplink-downlink decoupling and uplink-downlink recoupling a corresponding one of later and earlier than previously;
wherein said determining logic is further operable to determine that said radio link failure occurred in uplink due to at least one of:
uplink-downlink decoupling occurring too late when higher than a threshold amount of interference is received on said uplink by said network node, followed by a handover of user equipment to said network node coinciding with a reduction in said interference and said initiating action comprises optimising control of user equipment to perform uplink-downlink decoupling earlier than previously;
uplink-downlink recoupling occurring too early when higher than a threshold amount of interference is received on said uplink by said network node following an uplink-downlink recoupling of user equipment, followed by a handover of user equipment to said network node coinciding with a reduction in said interference and said initiating action comprises optimising control of user equipment to perform uplink-downlink recoupling later than previously;
uplink-downlink recoupling occurring too late when said radio link failure in uplink occurred following an uplink-downlink recoupling of user equipment following an uplink-downlink decoupling of said user equipment for greater than a threshold amount of time and said initiating action comprises optimising control of user equipment to perform uplink-downlink recoupling earlier than previously; and
uplink-downlink decoupling occurring too early when said radio link failure in uplink occurred within a threshold amount of time following an uplink-downlink decoupling of user equipment and said initiating action comprises optimising control of user equipment to perform uplink-downlink decoupling later than previously.

11. A method, performed by a wireless telecommunications user equipment, comprising:
determining a cause of a radio link failure which occurred in downlink when said user equipment is in proximity to an uplink-downlink imbalance region, which is a region between a downlink boundary of a small cell and a macro cell, said downlink boundary being where received pilot power from said macro cell and received pilot power from said small cell are the same and an uplink boundary of said small cell and said macro cell, said uplink boundary being where uplink path loss to said macro cell and to said small cell are the same, and determining that said radio link failure occurred due to one of uplink-downlink decoupling in which uplink and downlink streams are served by different cells, and uplink-downlink recoupling in which uplink and downlink streams are served by a same cell, occurring one of too early and too late; and
in response to said cause of said radio link failure, initiating action to optimize control of user equipment uplink-downlink decoupling-recoupling when in proximity to said uplink-downlink imbalance region, said step of initiating action comprising transmitting a radio link failure message indicating that one of said uplink-downlink decoupling and uplink-downlink recoupling occurred one of too early and too late; wherein said determining comprises determining that said radio link failure occurred in said downlink due to at least one of:
uplink-downlink recoupling occurring too late when said radio link failure in downlink occurred after a threshold amount of time following uplink-downlink decouplinq of user equipment and said initiating action comprises optimising control of user equipment to perform uplink-downlink recoupling earlier than previously;

uplink-downlink recoupling occurring too early when said radio link failure in downlink occurred within a threshold amount of time following uplink-downlink recoupling to that cell previously receiving uplink and said initiating action comprises optimising control of user equipment to perform uplink-downlink recoupling later than previously;

uplink-downlink decoupling occurring too late when said radio link failure in downlink occurred within a threshold amount of time following being configured for uplink-downlink decoupling, but prior to said uplink-downlink decoupling occurring and said initiating action comprises optimising control of user equipment to perform uplink-downlink decoupling earlier than previously; and uplink-downlink decoupling occurring too early when said radio link failure in downlink occurred within a threshold amount of time following initiation of uplink-downlink decoupling, and said initiating action comprises optimising control of user equipment to perform uplink-downlink decoupling later than previously.

12. A wireless telecommunications user equipment, comprising:

determining logic operable to determine a cause of a radio link failure which occurred in downlink when said user equipment is in proximity to an uplink-downlink imbalance region which is a region between a downlink boundary of a small cell and a macro cell, said downlink boundary being where received pilot power from said macro cell and received pilot power from said small cell are the same and an uplink boundary of said small cell and said macro cell, said uplink boundary being where uplink path loss to said macro cell and to said small cell are the same, and operable to determine that said radio link failure occurred due to one of uplink-downlink decoupling in which uplink and downlink streams are served by different cells, and uplink-downlink recoupling in which uplink and downlink streams are served by a same cell, occurring one of too early and too late and, in response to said cause of said radio link failure, to initiate action to optimize control of user equipment uplink-downlink decoupling-recoupling when in proximity to said uplink-downlink imbalance region by transmitting a radio link failure message indicating that one of said uplink-downlink decoupling and uplink-downlink recoupling occurred one of too early and too late;

wherein said determining logic is further operable to determine that said radio link failure occurred in said downlink due to at least one of:

uplink-downlink recoupling occurring too late when said radio link failure in downlink occurred after a threshold amount of time following uplink-downlink decoupling of user equipment and said initiating action comprises optimising control of user equipment to perform uplink-downlink recoupling earlier than previously;

uplink-downlink recoupling occurring too early when said radio link failure in downlink occurred within a threshold amount of time following uplink-downlink recoupling to that cell previously receiving uplink and said initiating action comprises optimising control of user equipment to perform uplink-downlink recoupling later than previously;

uplink-downlink decoupling occurring too late when said radio link failure in downlink occurred within a threshold amount of time following being configured for uplink-downlink decoupling, but prior to said uplink-downlink decoupling occurring and said initiating action comprises optimising control of user equipment to perform uplink-downlink decoupling earlier than previously; and uplink-downlink decoupling occurring too early when said radio link failure in downlink occurred within a threshold amount of time following initiation of uplink-downlink decoupling, and said initiating action comprises optimising control of user equipment to perform uplink-downlink decoupling later than previously.

* * * * *